(12) United States Patent
Shin

(10) Patent No.: US 11,707,640 B2
(45) Date of Patent: Jul. 25, 2023

(54) FIRE EXTINGUISHING SYSTEM FOR TIRE OF VEHICLE

(71) Applicants: Hyundai Motor Company, Seoul (KR); Kia Motors Corporation, Seoul (KR)

(72) Inventor: Hyeon Gi Shin, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 150 days.

(21) Appl. No.: 17/007,352

(22) Filed: Aug. 31, 2020

(65) Prior Publication Data

US 2021/0069534 A1 Mar. 11, 2021

(30) Foreign Application Priority Data

Sep. 6, 2019 (KR) .................. 10-2019-0110438

(51) Int. Cl.
| | |
|---|---|
| *A62C 3/07* | (2006.01) |
| *A62C 37/48* | (2006.01) |
| *A62C 37/38* | (2006.01) |
| *B60Q 1/52* | (2006.01) |
| *B60Q 5/00* | (2006.01) |
| *B60Q 3/70* | (2017.01) |

(52) U.S. Cl.
CPC ............ *A62C 3/07* (2013.01); *A62C 37/38* (2013.01); *A62C 37/48* (2013.01); *B60Q 1/52* (2013.01); *B60Q 3/70* (2017.02); *B60Q 5/005* (2013.01)

(58) Field of Classification Search
CPC .......... A62C 3/07; A62C 3/08; A62C 3/0207; A62C 35/023; A62C 35/13; A62C 37/04; A62C 37/36; A62C 37/11; A62C 13/62; A62C 13/66; B60Q 5/005; B60Q 1/52; B60Q 3/07
See application file for complete search history.

(56) References Cited

U.S. PATENT DOCUMENTS

| | | | | |
|---|---|---|---|---|
| 9,573,005 | B2* | 2/2017 | Wedowski | A62C 3/14 |
| 2004/0216903 | A1* | 11/2004 | Wierenga | A62C 35/58 |
| | | | | 169/85 |
| 2004/0226726 | A1* | 11/2004 | Holland | A62C 3/07 |
| | | | | 169/62 |

(Continued)

FOREIGN PATENT DOCUMENTS

| | | |
|---|---|---|
| CN | 206852957 U | 1/2018 |
| CN | 108144221 A | 6/2018 |

(Continued)

OTHER PUBLICATIONS

Wikipedia, Pyrotechnic Initiator, Nov. 18, 2016 (Year: 2016).*

(Continued)

*Primary Examiner* — Christopher R Dandridge
(74) *Attorney, Agent, or Firm* — Slater Matsil, LLP

(57) ABSTRACT

A fire extinguishing system is provided for a tire of a vehicle. The fire extinguishing system includes fire extinguishing injectors filled with fire extinguishing chemicals and installed in the vehicle to be able to inject the fire extinguishing chemical to the tire. A fire detection line is installed to connect between the fire extinguishing injectors. Each of the fire extinguishing injectors is configured to inject the fire extinguishing chemical when a fire of the tire is detected through the fire detection line.

20 Claims, 5 Drawing Sheets

(56) References Cited

U.S. PATENT DOCUMENTS

2013/0186654 A1* 7/2013 Dunster ................ A62C 3/07
169/62
2014/0360739 A1 12/2014 Wedowski
2016/0279453 A1 9/2016 Ernfjäll

FOREIGN PATENT DOCUMENTS

CN 109395280 A 3/2019
EP 2617467 A1 7/2013

OTHER PUBLICATIONS

Wikipedia, Pyrotechnic Composition, Nov. 25, 2016 (Year: 2016).*
Wikipedia, Gas Generator, Aug. 27, 2016 (Year: 2016).*
Wikipedia, Bridgewire, Nov. 9, 2016 (Year: 2016).*

* cited by examiner

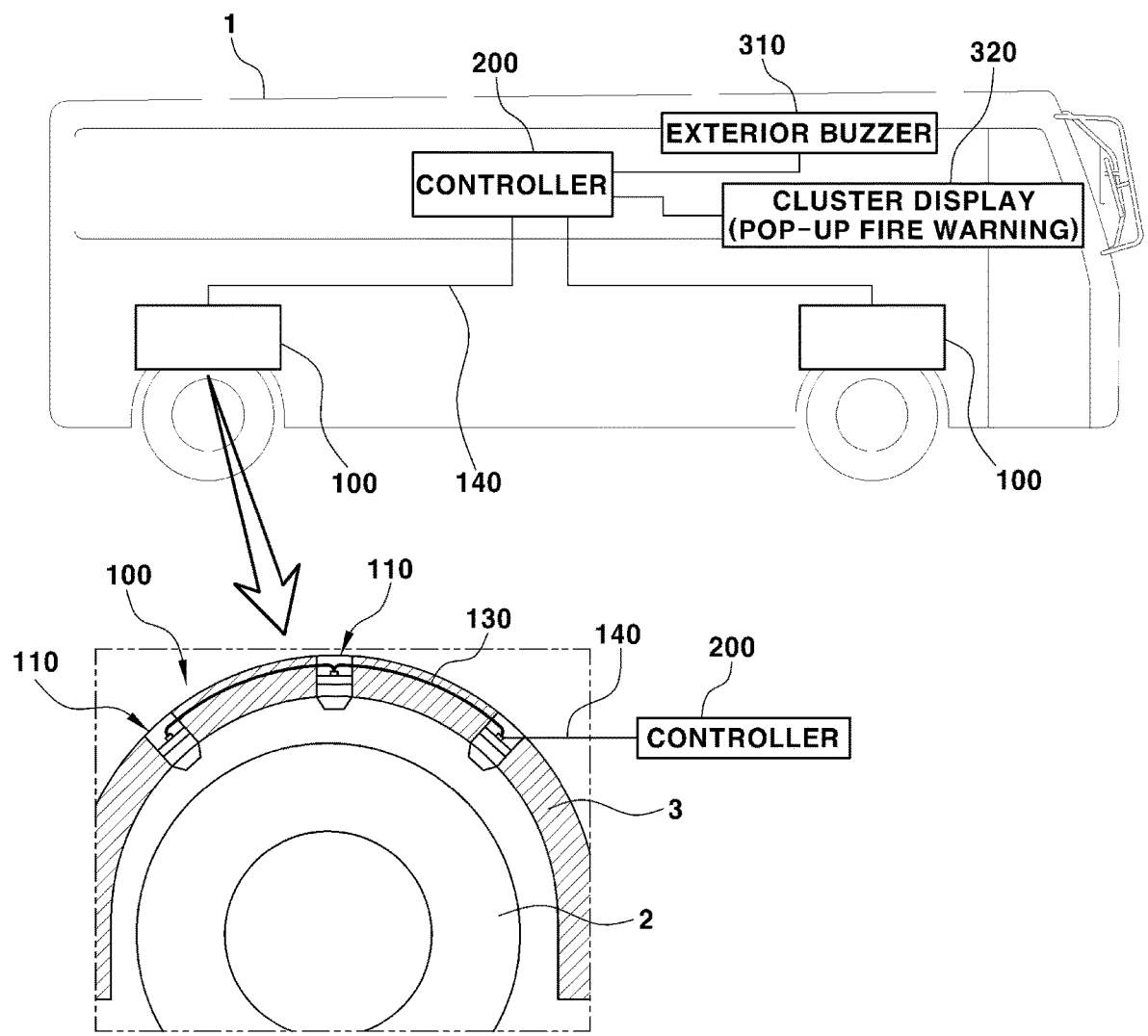
[FIG. 1]

[FIG. 2]
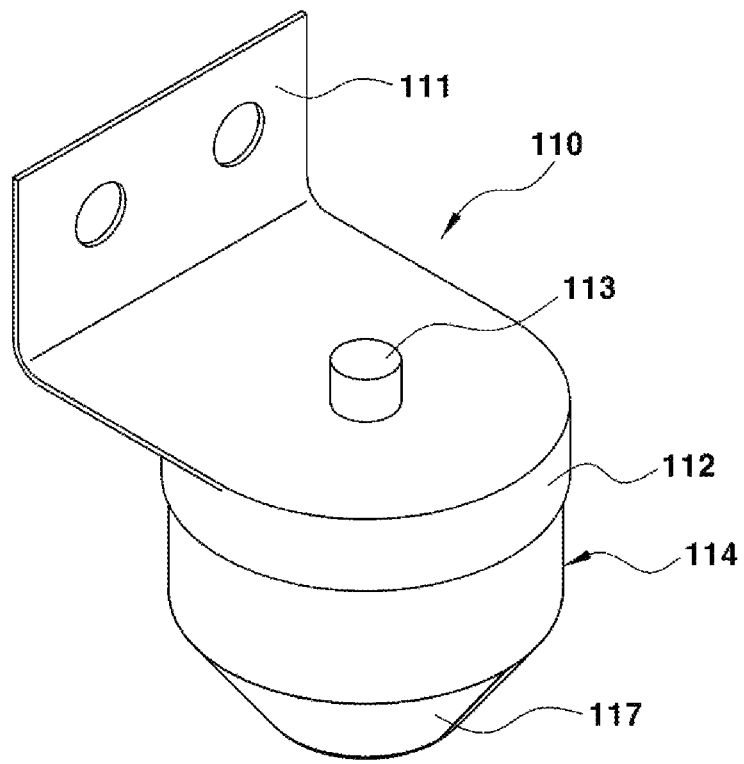
[FIG. 3]
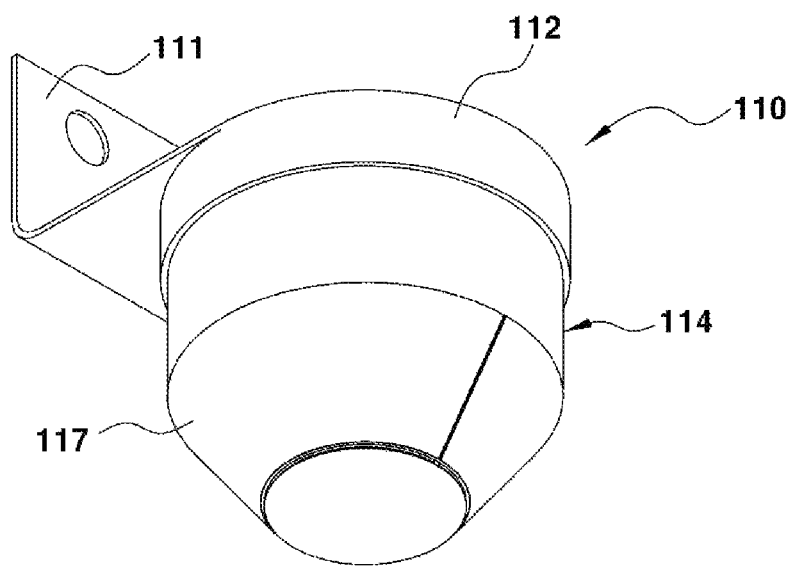

[FIG. 4]
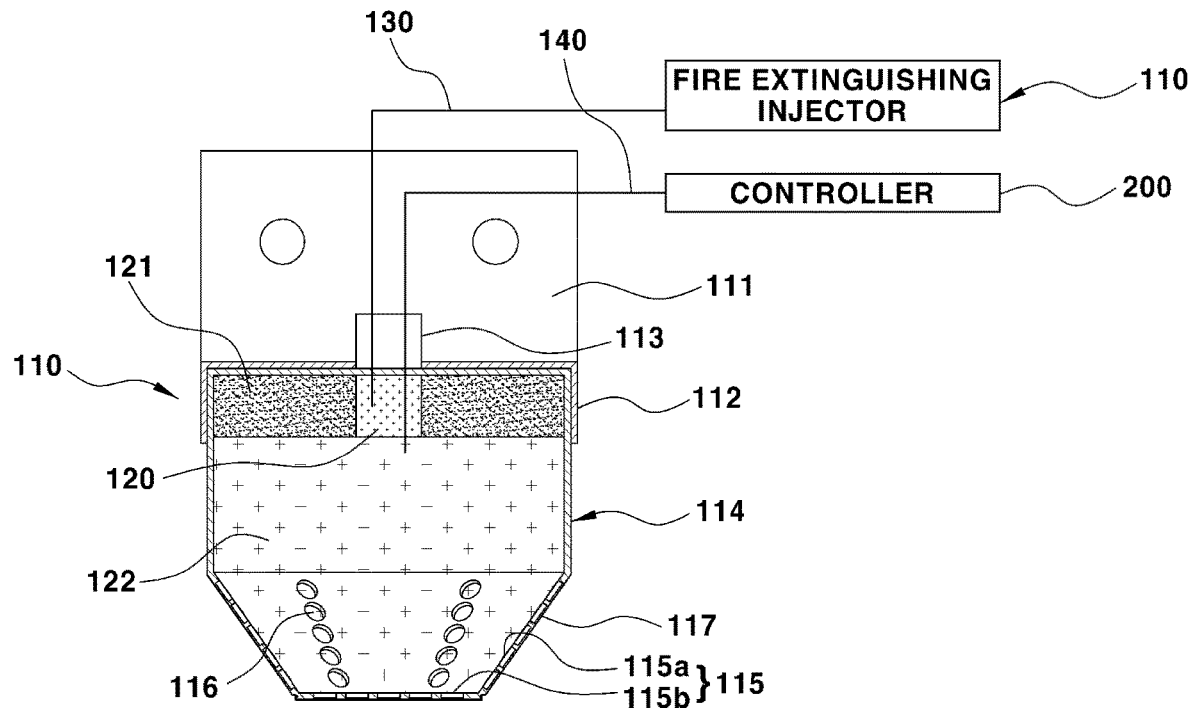
[FIG. 5]
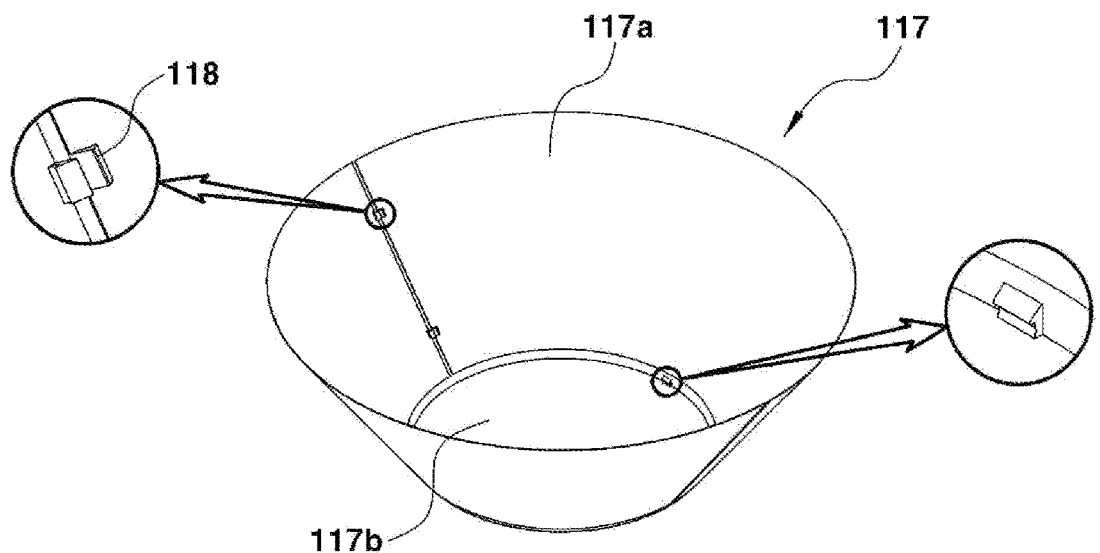

[FIG. 6]
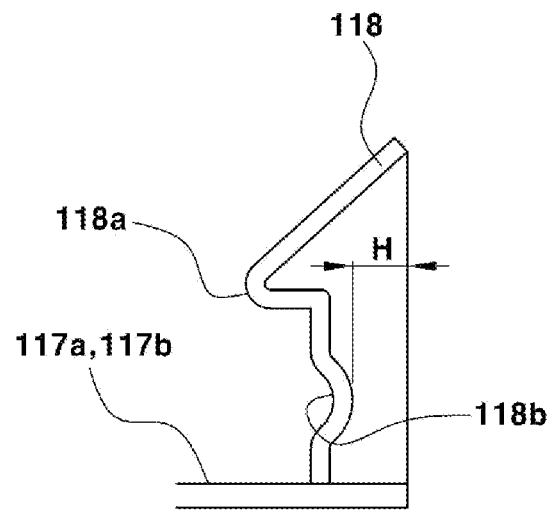
[FIG. 7]
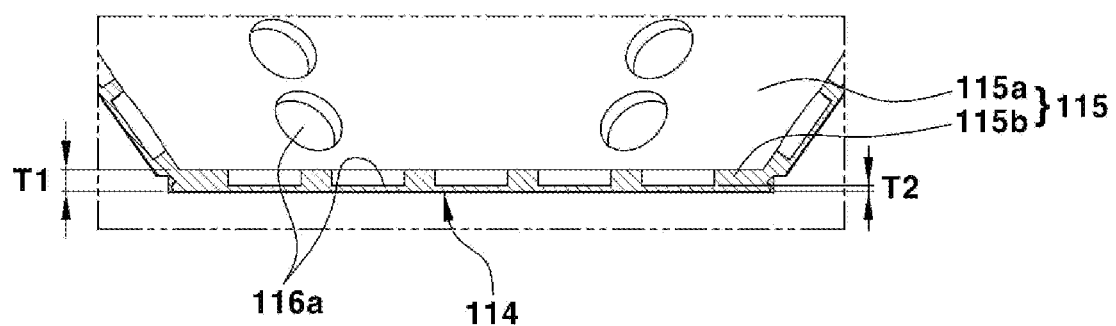

[FIG. 8]
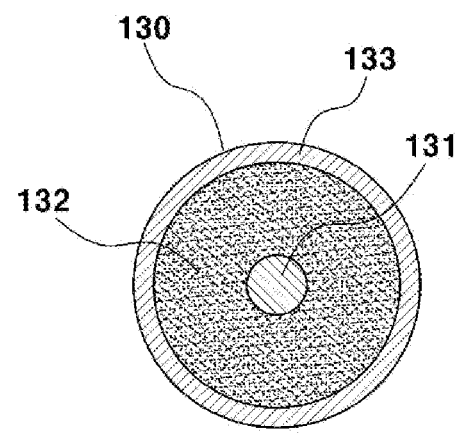
[FIG. 9]
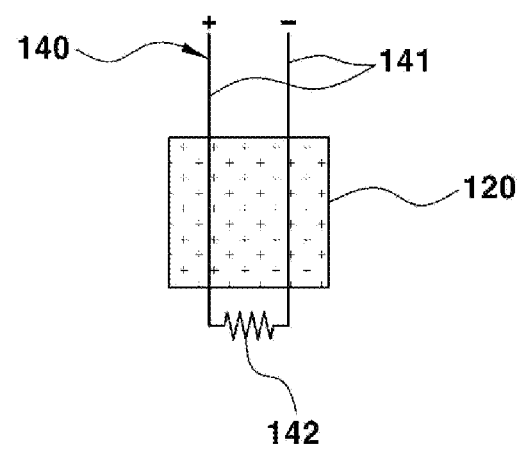

FIRE EXTINGUISHING SYSTEM FOR TIRE OF VEHICLE

CROSS-REFERENCE TO RELATED APPLICATIONS

This application claims priority to Korean Patent Application No. 10-2019-0110438, filed on Sep. 6, 2019, which application is hereby incorporated herein by reference.

TECHNICAL FIELD

The present disclosure relates to a fire extinguishing device of a vehicle.

BACKGROUND

Generally, since fuel which is a flammable material is used in vehicles and many heat sources are present as well as various electric lines are intertwined and installed in the vehicles, there is a risk of a fire.

For example, since a high temperature engine and various electric devices are installed in an engine room, the engine and the electric devices may be damaged and malfunction and thus a fire may occur due to various causes such as a vehicle crash and the like.

Further, in the engine room, owing to various causes of engine overheating and a post-treatment of an exhaust gas, there is a risk of a fire while a vehicle is driving.

Recently, as the use of eco-friendly vehicles such as an electric vehicles increases, a risk of a fire due to an external impact or an internal short circuit in a battery or a high voltage electric line is increasing.

A method of using a fire extinguisher is widely known as a method of coping with a fire in a vehicle. However, when a driver fails to use the fire extinguisher on time, an initial extinguishing fails such that the fire may be spread throughout the vehicle.

Further, in the case of public transportation vehicles such as buses, since many passengers are on board, fire prevention management for the purpose of passenger safety is essential. When a fire breaks out, it is likely to lead to a catastrophic disaster.

Further, since a driver is present in an interior of a vehicle while the vehicle is driving, even when a fire breaks out inside an engine room, the driver does not often quickly recognize occurrence of the fire until a large amount of smoke is generated, and, unlike a passenger car, in the case of a bus, an engine room is located in a rear side of the bus such that it is difficult for the driver to know a fire of the engine room.

Therefore, the driver cannot perform a rapid fire extinguishing operation in an early stage of the fire so that the fire may be spread to lead to a total loss by fire of the vehicle and a risk of a damage of human life increases.

Further, even when the driver or passenger in a vehicle interior quickly recognizes the fire, it is difficult to rapidly extinguish the fire at an early state with only small fire extinguishers provided in the vehicle.

Accordingly, when a fire is detected in an engine room of a vehicle, a fire extinguishing system is known which can extinguish the fire at an early stage by automatically injecting a fire extinguishing chemical toward an ignition position.

In a known engine room fire extinguishing system, when a fire breaks out in an engine room, a fire detection signal is transmitted and high pressure nitrogen filling in a nitrogen tank is supplied to a cylinder filled with a fire extinguishing chemical through a hose.

Thus, in the cylinder of the fire extinguishing chemical, a piston is operated due to the high pressure nitrogen and the fire extinguishing chemical filling in the cylinder is supplied to an injection line at a high pressure due to a pushing force of the piston. Then, the fire extinguishing chemical is injected to a fire occurrence position through a nozzle of the injection line, thereby extinguishing the fire.

In the engine room fire extinguishing system, the high pressure nitrogen is used as a driving gas so as to operate the piston, and a high pressure hose is connected between the tank filled with the high pressure nitrogen and the cylinder filled with the fire extinguishing chemical.

Further, the injection line connected to the cylinder of the fire extinguishing chemical is disposed along a predetermined position in the engine room, and a fire detection line for detecting a fire in the engine room is also disposed along a predetermined position in the engine room.

However, the conventional fire extinguishing system is effective in extinguishing a fire in a limited space in a vehicle.

For example, the conventional fire extinguishing system is useful for an initial extinguishing of a fire in the engine room by automatically detecting a fire, which breaks out in a predetermined space such as the engine room in the vehicle, through the fire detection line disposed in the predetermined space and injecting the fire extinguishing chemical filled in the cylinder through the nozzle of the injection spray line disposed in the predetermined space.

However, the conventional fire extinguishing system cannot cover regions in which front, rear, left, and tires are disposed in the vehicle, i.e., all four tire regions in the vehicle, and a single system cannot be used for extinguishing a fire with respect to all the four tire regions.

That is, the system can be configured by providing a single nitrogen tank and a single cylinder of a fire extinguishing chemical in a vehicle and installing a fire detection line and an injection line in all the four tire regions. However, as the injection line becomes longer, an injection pressure of the fire extinguishing chemical becomes weak such that performance of a fire extinguishing is degraded.

In particular, in the case of large buses or trucks, since a distance between tires is large, it is impossible to cope with fires in all four tire regions with only a single nitrogen tank and a single cylinder of a fire extinguishing chemical.

When the conventional fire extinguishing system is applied, since fire extinguishing chemicals are simultaneously injected in all four tire regions, a nitrogen tank and a cylinder of the fire extinguishing chemical should be operated at a high pressure for the purpose of a normal operation.

Further, when a nitrogen tank and a cylinder of a fire extinguishing chemical are installed in each tire region, a cost is inevitably significantly increased.

In addition, when the conventional fire extinguishing system is applied, even though a fire breaks out in only one among the four tire regions, there is a problem in that the fire extinguishing chemical is injected in all the four tire regions.

SUMMARY

The present disclosure relates to a fire extinguishing device of a vehicle. Particular embodiments relate to a fire extinguishing device of a tire, which is capable of automatically detecting and extinguishing a fire occurring from a tire of a vehicle.

Embodiments disclosed herein can solve the above-described problems associated with prior art.

In one aspect, the present disclosure provides a fire extinguishing system for a tire of a vehicle, which is capable of effectively coping with a fire with respect to all tire regions in a vehicle and detecting the fire with respect to only a tire at which the fire breaks out to automatically inject a fire extinguishing chemical, thereby extinguishing the fire more efficiently, rapidly, and accurately as compared when a system having the conventional configuration is applied.

In a preferred embodiment, a fire extinguishing system for a tire of a vehicle includes a plurality of fire extinguishing injectors filled with fire extinguishing chemicals and installed in a vehicle to be able to inject the fire extinguishing chemical to a tire. A fire detection line is installed to connect between the plurality of fire extinguishing injectors. When a fire of the tire is detected through the fire detection line, each of the fire extinguishing injectors is configured to inject the fire extinguishing chemical.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 1 is a diagram illustrating a major configuration and an arrangement state of a fire extinguishing system for a tire according to an embodiment of the present disclosure;

FIGS. 2 and 3 are perspective views illustrating a fire extinguishing injector in the fire extinguishing system according to the embodiment of the present disclosure;

FIG. 4 is a cross-sectional view of the fire extinguishing injector in the fire extinguishing system according to the embodiment of the present disclosure;

FIG. 5 is a perspective view illustrating a cover of the fire extinguishing injector in the fire extinguishing system according to the embodiment of the present disclosure;

FIG. 6 is a diagram illustrating a shape of a hook formed on the cover of the fire extinguishing injector in the fire extinguishing system according to the embodiment of the present disclosure;

FIG. 7 is a cross-sectional view illustrating a lower portion of a tank of a fire extinguishing injector in a fire extinguishing system according to another embodiment of the present disclosure;

FIG. 8 is a cross-sectional view illustrating a fire detection line in a fire extinguishing system according to an embodiment of the present disclosure; and FIG. 9 is a configurational diagram illustrating a signal transfer line in a fire extinguishing system according to an embodiment of the present disclosure.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF ILLUSTRATIVE EMBODIMENTS

Hereinafter, embodiments of the present disclosure will be fully described in a detail which is suitable for implementation by those skilled in the art to which the present disclosure pertains with reference to the accompanying drawings. However, the present disclosure is not limited to the embodiment disclosed herein and may be implemented in other forms.

Throughout this disclosure, when an element is referred to as "comprising" a component, it refers that the element can further include other components, not excluding the other components unless specifically stated otherwise.

The present disclosure relates to a fire extinguishing device of a vehicle. More particularly, it relates to a fire extinguishing device of a tire, which is capable of automatically detecting and extinguishing a fire occurring from a tire of a vehicle.

Further, the present disclosure provides a fire extinguishing system for a tire, which is capable of effectively coping with a fire with respect to an entirety of tire regions in a vehicle and detecting a fire with respect to only a tire at which a fire breaks out to automatically inject a fire extinguishing chemical, thereby extinguishing the fire more efficiently, rapidly, and accurately as compared when the conventional system is applied.

FIG. 1 is a diagram illustrating a major configuration and an arrangement state of a fire extinguishing system for a tire according to an embodiment of the present disclosure.

As shown in the drawing, the fire extinguishing system for a tire according to the present disclosure is useful for a large vehicle such as a bus or a truck, and the same configuration may be provided in each region in which a tire 2 is installed in a vehicle 1.

In this case, the configuration of the fire extinguishing system in each tire region may be operated individually and independently. For example, a series of operations of detecting a fire and injecting a fire extinguishing chemical may be independently performed in each tire region.

Further, a configuration of an individual fire extinguishing system installed in each tire region, i.e., a fire extinguishing unit 100 shown in an enlarged diagram at a lower side of FIG. 1 is configured to automatically perform a series of detecting a fire when the fire breaks out and injecting a fire extinguishing chemical.

In the following description, the tire region may include the tire 2 and a tire upper region in the vehicle 1, and, more broadly, the tire region may include all vehicle body regions around a tire periphery in which the tire 2 is installed.

In the present disclosure, when a fire breaks out, the fire extinguishing unit 100 for automatically detecting the fire and injecting a fire extinguishing chemical may be installed in one or more regions among four front, rear, left, and right tire regions.

That is, the fire extinguishing system according to the present disclosure may be installed in all the four tire regions in the vehicle 1 but may be selectively installed only in a predetermined region among of the four tire regions.

Looking at the configuration, as shown in FIG. 1, the fire extinguishing system according to an embodiment of the present disclosure includes a fire extinguishing injector no which is mounted at a position capable of injecting a fire extinguishing chemical to the tire in the vehicle 1, and a fire detection line 130 connected to the fire extinguishing injector no.

In an exemplary embodiment of the present disclosure, a plurality of fire extinguishing injectors 110 may be installed to be disposed at a predetermined interval from a lower portion of the vehicle 1 to an upper side of the tire 2, and fire detection lines 130 may be installed to connect between the plurality of fire extinguishing injectors 110.

In an embodiment of the present disclosure, the plurality of fire extinguishing injector no may be installed in a vehicle body portion 3 of the lower portion of the vehicle 1, e.g., in a wheel house which is a vehicle body portion at the upper side of the tire 2 and installed in a lower side of the wheel house along the tire 2 at a predetermined interval in a forward-backward direction.

An example in which three fire extinguishing injectors 110 are installed above tire 2 and the fire detection lines 130 connecting between the three fire extinguishing injectors 110 are illustrated in FIG. 1.

The number of illustrated fire extinguishing injectors and the number of illustrated fire detection lines are illustrative, the present disclosure is not limited thereto, and the number of fire extinguishing injectors and the number of fire detection lines may be variously varied.

According to the configuration of the illustrated example, when a fire breaks out in the tire 2, occurrence of the fire in the tire 2 is detected by the fire detection lines 130. In this case, the plurality of fire extinguishing injectors 110 installed above the tire 2 are simultaneously operated to inject fire extinguishing chemicals.

To this end, when one among the plurality of fire detection lines 130 connecting between the fire extinguishing injectors 110 detects the occurrence of the fire in the tire 2, it may be configured such that a fire detection signal is transmitted to two fire extinguishing injectors 110 connected to both ends of the one fire detection line 130 therethrough.

Further, it may be configured such that the fire detection signal transmitted to the two fire extinguishing injectors 110 is also transmitted to the remaining fire extinguishing injector no through another fire detection line 130.

Consequently, all the fire extinguishing injectors 110 receiving the fire detection signal may be operated to simultaneously inject the fire extinguishing chemicals to the tire 2 therebelow, and the fire extinguishing chemicals may be uniformly injected from all the fire extinguishing injectors 110 such that a fire extinguishing may be reliably performed at an initial stage.

In an embodiment of the present disclosure, a signal transfer line 140 may be connected to at least one among the plurality of fire extinguishing injectors 110 so as to transfer the fire detection signal to the outside. The signal transfer line 140 may be an electrically conductive line for transferring an electrical signal to an external controller (a fire control unit (FCU) 200).

Here, the FCU 200 receives the fire detection signal through the signal transfer line 140, recognizes the occurrence of the fire in the tire 2 of the vehicle 1, and then operates notification devices 310 and 320 informing the occurrence of the fire in the tire 2.

In an exemplary embodiment of the present disclosure, the notification device may be one among a sound output device 310, a display device 320, and a lamp (not shown) which are installed in the vehicle 1 and is operated to notify occurrence of a fire according to a control signal output from the FCU 200.

Here, the sound output device 310 may be a buzzer which installed in an interior or exterior portion of the vehicle 1, the display device 320 may be a display or other in-vehicle display (e.g., an audio visual navigation (AVN) display) installed in a cluster, and the lamp may be a warning lamp installed in the cluster or in the interior or exterior of the vehicle 1.

Further, in an embodiment of the present disclosure, the fire extinguishing injectors 110 may be provided to inject the powder fire extinguishing chemicals, and each of the fire extinguishing injectors 110, which will be described below, may include a small fire extinguishing chemical tank 114 in FIG. 4 filled with a powder fire extinguishing chemical.

As described above, in the fire extinguishing system according to the present disclosure, each of the fire extinguishing injectors 110 installed in each tire 2 of the vehicle 1 is configured to individually inject the fire extinguishing chemical by including the fire extinguishing chemical tank 114 so that complicated pipes as in the prior art, such as a fire extinguishing chemical supply hose or an injection line which connects the four front, rear, left, and right tire regions, are not necessary.

Further, since the conventional fire suppression system is a centralized system using a common nitrogen tank and a cylinder, it is impossible to cope with a fire with respect to a plurality of tire regions which are spaced apart at a long distance.

In particular, since a distance between tires is long in commercial vehicles such as large buses and trucks, when the conventional fire extinguishing system is applied, an injection line becomes longer and thus degradation phenomena in injection pressure and injection force occur such that it is impossible to extinguish a fire through fire extinguishing chemical injection.

Further, when the conventional centralized system is applied, even though a fire breaks out in one tire, the fire extinguishing chemical is injected to all the four tire regions such that it is inefficient and thus excessive after service (A/S) costs may occur.

On the other hand, in the fire extinguishing system according to the present disclosure, since the fire extinguishing chemical is injected to only a tire at which a fire breaks out to extinguish the fire, it is more advantageous in terms of A/S, and, since the fire extinguishing injector individually has an integrated configuration including both a nozzle (which is an injection hole which will be described below) and a tank and has a small size, it is advantageous in terms of mounting.

Meanwhile, an individual configuration of the fire extinguishing system according to an embodiment of the present disclosure will be described in more detail with reference to the drawings.

FIGS. 2 and 3 are perspective views illustrating the fire extinguishing injector in the fire extinguishing system according to the embodiment of the present disclosure, FIG. 2 is a plan perspective view, and FIG. 3 is a bottom perspective view.

Further, FIG. 4 is a cross-sectional view of the fire extinguishing injector in the fire extinguishing system according to the embodiment of the present disclosure, FIG. 5 is a perspective view illustrating a cover of the fire extinguishing injector in the fire extinguishing system according to the embodiment of the present disclosure, and FIG. 6 is a diagram illustrating a shape of a hook formed on the cover of the fire extinguishing injector in the fire extinguishing system according to the embodiment of the present disclosure.

As shown in the drawings, in the embodiment of the present disclosure, the fire extinguishing injector 110 may have a configuration integrated a tank which is filled with a fire extinguishing chemical 122 and may include a bracket 111, a pressure generator 112, a tank 114, and a cover 117.

First, the bracket 111 is provided so as to mount the fire extinguishing injector 110. The bracket 111 may be provided to fix to or engage with the vehicle body portion of the lower portion of the vehicle or provided to fix to or engage with a wheel house located above a tire as the vehicle body portion of the lower portion of the vehicle.

In this case, when the bracket 111 is a vehicle body portion which cannot be welded to the vehicle body portion 3 in FIG. 1, the bracket 111 may be fixed to the vehicle body portion 3 by being engaged with the vehicle body portion 3 using engagement parts such as bolts, nuts, screws, and fasteners.

In the embodiment of the present disclosure, the pressure generator 112 is integrally connected to the bracket 111, and an insertion part 113 into which the fire detection line 130 and the signal transfer line 140 are inserted is provided to be coupled to the pressure generator 112 by passing therethrough.

As illustrated in FIG. 2, in the embodiment of the present disclosure, the insertion part 113 may be provided at one side of a case of the pressure generator 112.

Further, the tank 114 is coupled to a lower side of the pressure generator 112. An upper portion of the tank 114 may be inserted into and coupled to the pressure generator 112.

In this case, the tank 114 may be detachably coupled to the pressure generator 112. To this end, the pressure generator 112 and the tank 114 may be coupled by a screw engagement method.

That is, the upper portion of the tank 114 is inserted into the pressure generator 112 to be screw-engaged therewith. In order for a screw engagement, a screw thread is processed on an upper outer circumferential surface of the tank 114 and an inner circumferential surface of the pressure generator 112.

As described above, the pressure generator 112 and the tank 114 are coupled by a screw engagement method such that, when the tank is recharged after the fire extinguishing chemical is used or when A/S is performed, it is possible to easily separate the tank 114 from the pressure generator 112 or to couple the tank 114 to the pressure generator 112.

In such a configuration, the pressure generator 112 serves as a cap for sealing the upper portion of the tank 114 and is formed in a shape having an inner space of a predetermined volume.

Further, the pressure generation chemical 121 may be installed in the pressure generator 112 so as to generate an injection pressure. When ignition occurs, the pressure generation chemical 121 may be used to be combusted to generate an expansion gas, thereby forming a high pressure.

For example, in the embodiment of the present disclosure, a solid pressure generation chemical may be used as the pressure generation chemical 121. More specifically, solid fuel prepared by stirring sorbitol and potassium nitrate ($KNO_3$), i.e., KNSB, may be used as the pressure generation chemical 121.

Further, an ignition agent 120 is installed in the pressure generator 112 so as to contact to the pressure generation chemical 121. The fire detection line 130 inserted into the pressure generator 112 through the insertion part 113 is connected to the ignition agent 120.

Further, the signal transfer line 140 for transferring a fire detection signal to the external FCU 200 is connected to the ignition agent 120. As described above, the signal transfer line 140 is a wire through which a current may flow, i.e., an electrically conductive line and is connected to a controller 200 in FIG. 1) by passing through the insertion part 113 of the pressure generator 112 from the ignition agent 120.

In the embodiment of the present disclosure, the signal transfer line 140 may be selectively connected to only one or some among the plurality of fire extinguishing injectors 110 installed in one tire region.

Further, in the pressure generator 112, the ignition agent 120 is ignited due to a flame transmitted through the fire detection line 130 to serve to ignite the pressure generation chemical 121 in the pressure generator 112. A known material capable of igniting KNSB or solid fuel may be used as the ignition agent 120.

In the embodiment of the present disclosure, as shown in FIG. 4, when the upper portion of the tank 114 is inserted into the pressure generator 112 to be screw-engaged therewith, a position of the pressure generation chemical 121 filling in the pressure generator 112 is an inner space of the pressure generator 112 and, simultaneously, an inner space of the upper portion of the tank 114 inserted into the pressure generator 112.

In this case, as illustrated in FIG. 4, the ignition agent 120 may be inserted into and located at a center of the pressure generation chemical 121, and the fire detection line 130 and the signal transfer line 140, which are inserted to pass through the insertion part 113, are connected to an inner side of the ignition agent 120.

In the embodiment of the present disclosure, the tank 114 of the configurations of the fire extinguishing injector no is manufactured in the form of a container having an inner space, and an interior of the tank 114 is filled with the powder fire extinguishing chemical 122. In this case, the filling powder fire extinguishing chemical 122 is located below the pressure generation chemical 121 in the tank 114.

An upper portion of the inner space of the tank 114 is sealed by the pressure generator 112 coupled to the upper portion of the tank 114. A plurality of injection holes 116, through which the fire extinguishing chemical 122 filled in the tank 114 may be discharged and injected, are formed in a tank lower portion 115.

In an exemplary embodiment of the present disclosure, the tank lower portion 115 may be provided in the form of a truncated conical container, i.e., in a truncated cone-shaped container. The plurality of injection holes 116 through which the fire extinguishing chemical 122 is injected may be formed in the tank lower portion 115 having the above described truncated cone-shaped container.

As shown in FIG. 4, in the tank lower portion 115, the plurality of injection holes 116 may be formed in both an inclined side surface portion 115a in a cross section of the truncated cone shape and a bottom surface portion 115b which is a bottom surface portion of the truncated cone shape.

Further, in the tank lower portion 115, the plurality of injection holes 116 may be formed at predetermined intervals in a circumferential direction. In this case, the plurality of injection holes 116 may be formed to constitute a column over the side surface portion 115a and the bottom surface portion 115b of the tank lower portion 115.

For example, the plurality of injection holes 116 may be formed to constitute a straight line over the side surface portion 115a and the bottom surface portion 115b of the tank lower portion 115. Thus, a plurality of arrangements of the injection holes 116 constituting a straight line may be formed at predetermined intervals in the circumferential direction of the tank lower portion 115.

As described above, since the shape of the tank lower portion 115, which is a portion from which the fire extinguishing chemical 122 is injected in the fire extinguishing injector no, has the truncated cone shape, the fire extinguishing chemical 122, which is injected through the plurality of injection holes 116 formed in the tank lower portion 115, may be injected downward in all directions.

That is, while the fire extinguishing chemical 122 is injected downward toward the tire 2 through the plurality of injection holes 116 formed in the tank lower portion 115 of the truncated cone shape, the fire extinguishing chemical 122 may widely spread over an entirety of the circumference perimeter to be injected downward.

Further, in the tank lower portion 115 of the truncated cone shape, the injected fire extinguishing chemical 122 may be uniformly distributed downward toward a wide area of the tire 2 due to the injection holes 116 disposed as described above.

Further, a cover 117 may be mounted on the tank lower portion 115, in which the injection holes 116 are formed, to seal the injection holes 116 of the tank lower portion 115 in a state in which the interior of the tank 114 is filled with the fire extinguishing chemical 122 so as to prevent the fire extinguishing chemical 122 from being discharged through the injection holes 116 in an ordinary situation.

In a state of being installed, the cover 117 is fixed to the tank lower portion 115 so as to seal the injection holes 116 in an ordinary situation.

In contrast, during injection, when the fire extinguishing chemical 122 expands due to a pressure generated from the pressure generator 112, an expansion pressure (injection pressure) of the fire extinguishing chemical 122 acting through the injection holes 116 pushes the cover 117. In this case, the cover 117 is separated and detached from the tank lower portion 115.

That is, in an ordinary situation, the cover 117 blocks the injection holes 116 to seal an inner space of the tank lower portion 115, and, when a pressure of the fire extinguishing chemical 122, which will be discharged through the injection holes 116, is largely applied to the cover 117 at a higher level of a force, the injection holes 116 are opened while the cover 117 fixed to the tank lower portion 115 is separated and detached. Thus, the fire extinguishing chemical 122 may be discharged and injected at a high pressure through the injection holes 116.

In an exemplary embodiment, the cover 117 is formed and provided in a shape in close contact with an entirety of an outer surface of the tank lower portion 115 in which the injection holes 116 are formed, i.e., in a shape in close contact with both the side surface portion 115a and the bottom surface portion 115b in the tank lower portion 115 of the truncated cone shape.

Further, in the exemplary embodiment, the cover 117 may be comprised of a plurality of separated cover members 117a and 117b. In this case, each of the cover members 117a and 117b is installed to maintain a close contact state with the tank lower portion 115 at a predetermined position.

In this case, the cover 117 may include a plurality of side surface cover members 117a coupled to be in close contact with the side surface portion 115a of the tank lower portion 115 and a circular bottom surface cover member 117b coupled to be in close contact with the bottom surface portion 115b of the tank lower portion 115.

As described above, the plurality of cover members 117a and 117b may be installed to be in close contact with the outer surface of the tank lower portion 115 such that the cover 117 may be configured to seal the injection holes 116 of the tank lower portion 115. A hook engagement structure is applied between the tank 114 and each of the cover members 117a and 117b for mutual coupling and fixing.

That is, in each of the cover members 117a and 117b, hooks 118 are integrally formed to protrude from a plurality of positions, and hook bumps (not shown) to which hook ends 118a of the hooks 118 will be hooked are provided at hook corresponding positions on the outer surface of the tank lower portion 115.

In the embodiment of the present disclosure, the hook bump may be provided by forming a groove, to which the hook end 118a of the hook 118 is hooked, on the outer surface of the tank lower portion 115.

Further, in a state in which the hooks 118 of the cover members 117a and 117b are hooked to corresponding grooves of the tank 114, the hooks 118 of the cover members 117a and 117b may maintain an engagement force in an ordinary situation, and, when the pressure generation chemical 121 is ignited, the hooks 118 of the cover members 117a and 117b may be configured to release an engagement state with the hook bumps due to the expansion pressure of the fire extinguishing chemical 122 acting through the injection holes 116.

To this end, a shear portion 118b having a shape, which is recessed in the middle of a length thereof so as to reduce a thickness thereof, may be formed in each of the hooks 118 formed in the cover members 117a and 117b.

The shear portion 118b of each hook 118 is a weaker portion than other portions of each hook 118 so that the shear portion 118b may be configured to be damaged by a force when a higher level of a pressure is applied to the cover members 117a and 117b.

For example, when a fire extinguishing chemical injection pressure of 20 bar or more is formed in the tank 114 after a fire breaks out and the fire extinguishing chemical injection pressure is applied to the cover 117 comprised of the cover members 117a and 117b, the shear portions 118b of the hooks 118 are damaged so that an engagement state of the cover members 117a and 117b is released due to the hooks 118. Consequently, the cover 117 may be automatically detached from the tank lower portion 115 to open the injection holes 116.

As described above, when a pressure of the fire extinguishing chemical 122 reaches 20 bar or more in the tank 114, the cover 117 is separated so that the powder fire extinguishing chemical 122 may be entirely uniformly injected through the injection holes 116.

In the present disclosure, each of the cover members 117a and 117b may be made of a plastic material, and an insulator (not shown) may be stacked and coupled to an inner surface of each of the cover members 117a and 117b.

The insulator may be formed of a rubber or silicon material and thus the cover members 117a and 117b are in completely close contact with the outer surface of the tank lower portion 115 such that it is possible to completely prevent the fire extinguishing chemical 122 from being externally discharged and prevent moisture and foreign materials from being introduced into the tank 114.

Meanwhile, FIG. 7 is a cross-sectional view illustrating the tank lower portion 115 of a fire extinguishing injector in a fire extinguishing system according to another embodiment of the present disclosure. As shown in the drawing, the injection holes 116 being located in the side surface portion 115a and the bottom surface portion 115b of the tank lower portion 115 may be the same as in the above-described embodiment.

However, the present embodiment is different from the above-described embodiment in that, in the side surface portion 115a and the bottom surface portion 115b of the tank lower portion 115, the injection holes 116 are formed in a groove shape which is recessed into an inner surface of each of the side surface portion 115a and the bottom surface portion 115b at positions of the injection holes 116, instead of a completely penetrated hole shape, i.e., a hole shape formed by passing through a wall of the tank 114.

That is, a groove 116a is formed in a portion corresponding to each of the injection holes 116 on the inner surface of the tank lower portion 115 so that a thickness T2 of the tank 114 in only the portion corresponding to each of the injection holes 116 is smaller than a thickness T1 of other portions of the tank 114.

Therefore, when the injection pressure is applied to the portion having the thin thickness through the fire extinguishing chemical 122 in the tank 114, the portion having the thin thickness may be damaged and thus the injection hole 116 may be formed.

During injection, when an injection pressure and an expansion pressure of the fire extinguishing chemical 122 are applied, other tank portions except for injection hole portions have the thick thickness T1 to withstand the pressures and maintain their shape. However, since the injection hole portions have the thin thickness T2, when the injection pressure is applied thereto, the injection hole portions are damaged to form holes through which the fire extinguishing chemical 122 may be injected.

As described above, the tank formed to have a thin thickness at each injection hole may be easily manufactured by a plastic injection molding method.

As a result, before the ignition of the ignition agent 120 and the expansion of the pressure generation chemical 121, i.e., until the injection pressure of the fire extinguishing chemical 122 is applied to the injection hole portion, since the injection hole portion becomes in a blocked state, the interior of the tank 114 may become in a sealed state and a filling state of the fire extinguishing chemical 122 in the tank 114 may be maintained.

Thus, in the present embodiment, the separate cover in the above-described embodiment for blocking the injection hole is not necessary, and, when the fire extinguishing chemical refills to be reused after the use thereof, there is an advantage in that only the tank 114 needs to be replaced.

In the present embodiment, since the thickness T1 of the tank, the thickness T2 of the injection hole portion, and a size of the injection hole portion affect an internal pressure during injection, optimum values should be derived through repeated pre-tests.

Next, FIG. 8 is a cross-sectional view illustrating a fire detection line in the fire extinguishing system according to the embodiment of the present disclosure. The fire detection line 130 is installed to connect between the ignition agents 120 of the two fire extinguishing injectors 110.

The fire detection line 130 serves as a fuse in which a flame is generated when a fire reaches and which is capable of transmitting the generated flame. In the present disclosure, fire detection is performed such that the fire detection line 130 reaches a fire generated at the tire 2, a flame is generated at the fire detection line 130, and the fire detection line 130 transmits the flame to ignite the ignition agent 120.

Looking at a configuration of the fire detection line 130, the fire detection line 130 includes an internal core line 131, gunpowder 132 filling to surround the core line 131, and a sheath material 133 sheathing to surround the gunpowder 132.

The sheath material 133 may be made of a plastic material and may prevent an inflow of dust and foreign materials, prevent contamination due to the inflow thereof, and serve to maintain a shape of the gunpowder 132.

Further, the core line 131 may be a copper wire and may serve to transfer heat and maintain the shape of the gunpowder 132.

The gunpowder 132 (black gunpowder) serves to generate a flame while reaching a fire and deliver the flame to the ignition agent 120.

A final end portion of the fire detection line 130 may be inserted into and connected to the ignition agent 120. Thus, when the flame is generated and transmitted to the fire detection line 130, the ignition agent 120 may be ignited.

FIG. 9 illustrates a configuration of a signal transfer line in the fire extinguishing system according to the embodiment of the present disclosure.

The signal transfer line 140 may be an electrically conductive line connected from the controller 200 in FIG. 1 to the ignition agent 120 of the fire extinguishing injector no and may include two conductive lines 141 connected from the controller 200 to the ignition agent 120 and a resistor 142 installed to connect between the two conductive line 141.

In the embodiment of the present disclosure, the two conductive lines 141 may be installed to pass through the ignition agent 120, and the resistor 142 may be installed between final end portions of the two conductive lines 141 passing through the ignition agent 120.

In such a configuration, when the ignition agent 120 is ignited during fire detection, portions of the two conductive lines 141 inserted into the ignition agent 120 are fused to each other due to a high temperature and thus the two conductive lines 141 are electrically connected such that an electrical short circuit occurs.

In this case, the controller 200 serves to apply a current through the conductive lines 141 and to receive current signals flowing through the two conductive line 141s or a voltage signal applied between the two conductive lines 141.

Thus, when the ignition agent 120 is ignited and a short circuit occurs between the two conductive lines 141, excessive current flows through the two conductive lines 141. Consequently, when the controller 200 reads a current signal or a voltage signal, fire occurrence may be recognized.

As described above, the configuration of the fire extinguishing system according to the embodiment of the present disclosure has been described in detail, and an operation state will be described below.

First, the configurations of the fire extinguishing system (the unit is indicated by the reference numeral "100" in FIG. 1) may be identically installed in the front, rear, left, and right tire regions of the vehicle. In each tire region, one among the plurality of fire extinguishing injectors 110 may be connected to the controller 200 through the signal transfer line 140.

In this case, when a fire breaks out in an arbitrary tire 2 in the vehicle 1, a flame is generated in the fire detection line 130 above the tire 2 at which the tire breaks out. The flame is transmitted to all the fire extinguishing injectors 110 in a corresponding tire region through the fire detection line 130.

Accordingly, the ignition agents 120 are ignited in all the fire extinguishing injectors 110 above the tire 2 at which the fire breaks out, and KNSB (solid fuel) which is the pressure generation chemical 121 is ignited due to the ignition agent 120 in each of the fire extinguishing injector no.

Thus, a gas is generated due to combustion of the KNSB. In this case, since a high gas pressure is generated, a high expansion gas pressure is applied to the powder fire extinguishing chemical 122 in the tank 114 to act as an injection pressure, and when the expansion gas pressure reaches a higher level of an injection pressure, the cover 117 is automatically detached and each injection hole 116 is opened.

Alternatively, as in the embodiment of FIG. 7, when a higher level of the injection pressure is applied, the injection hole portion of the tank 114, which is blocked, is damaged to be penetrated so that the injection hole portion is opened to be in a state in which the fire extinguishing chemical is injectable.

Consequently, the fire extinguishing chemical 122 may be injected through all the injection holes 116 of an entirety of the fire extinguishing injector no. The fire extinguishing chemical 122 is uniformly spread and injected to entirety of the tire region such that an initial fire extinguishing is performed.

Simultaneously, when the ignition agent 120 is ignited, the two conductive lines 141 of the signal transfer line 140 are short-circuited in a fire extinguishing injector connected to the signal transfer line 140 among the fire extinguishing injectors 110. In this case, the controller 200 detects a higher level of a current or voltage to recognize the fire occurrence.

Then, the controller 200 recognizing the fire occurrence of the tire operates the notification device to warn the fire occurrence. For example, the controller 200 may operate the buzzer 310, display a fire occurrence warning on the display 320 in a cluster, or operate a lamp to notify the fire occurrence.

In accordance with a fire extinguishing system for a tire of a vehicle according to the present disclosure, a fire with respect to all tire regions in a vehicle can be effectively coped with, and the fire can be detected with respect to only a tire at which the fire breaks out and then a fire extinguishing chemical can be automatically injected such that the fire can be extinguished more efficiently, rapidly, and accurately as compared when a system having the conventional configuration is applied.

Although the embodiments of the present disclosure have been described in detail, the scope of the prevent disclosure is not limited to these embodiments, and various modifications and improvements devised by those skilled in the art using the fundamental concept of the present disclosure, which is defined by the appended claims, further fall within the scope of the present disclosure.

What is claimed is:

1. A fire extinguishing system comprising:
   a plurality of fire extinguishing injectors filled with fire extinguishing chemicals, the fire extinguishing injectors configured to be installed in a vehicle to be able to inject the fire extinguishing chemical to a tire, wherein at least one fire extinguishing injector of the plurality of extinguishing injectors includes an ignition agent disposed therein; and
   a fire detection line installed to connect between the plurality of fire extinguishing injectors, wherein each of the fire extinguishing injectors is configured to inject the fire extinguishing chemical when a fire of the tire is detected through the fire detection line;
   wherein the ignition agent is connected to the fire detection line to be ignited by the fire detection line and connected to a signal transfer line configured to transmit a fire detection signal to a controller when the ignition agent is ignited;
   wherein the signal transfer line comprises two conductive lines connected from the controller to the ignition agent and a resistor installed to connect between the two conductive lines; and
   wherein the two conductive lines are provided to be fused to each other and short-circuited when the ignition agent is ignited.

2. The fire extinguishing system of claim 1, wherein each of the fire extinguishing injectors comprises:
   a pressure generator in which a pressure generation chemical is installed to generate an injection pressure; and
   a tank filled with the fire extinguishing chemical and having a plurality of injection holes.

3. The fire extinguishing system of claim 2, wherein:
   the fire detection line is connected to the pressure generator to generate the injection pressure due to the pressure generation chemical when a fire is detected through the fire detection line; and
   the tank is coupled to the pressure generator to allow the fire extinguishing chemical in the tank to be injected through the injection holes due to action of the injection pressure generated by the pressure generator.

4. The fire extinguishing system of claim 2, wherein:
   the ignition agent coupled to the pressure generation chemical is installed at the pressure generator; and
   the pressure generation chemical is configured to be ignited due to ignition of the ignition agent and thus the injection pressure is generated.

5. The fire extinguishing system of claim 4, wherein:
   the ignition agent is inserted into and located in a center of the pressure generation chemical; and
   the fire extinguishing chemical fills in the tank to be located below the pressure generation chemical and the ignition agent.

6. The fire extinguishing system of claim 4, wherein:
   the signal transfer line is connected to the ignition agent of the pressure generator in at least one fire extinguishing injector among the plurality of fire extinguishing injectors;
   the controller is connected to the ignition agent through the signal transfer line and configured to receive the fire detection signal through the signal transfer line and output a control signal for notifying occurrence of the fire; and
   a notification device is configured to be operated to notify the occurrence of the fire in response to the control signal which is output from the controller.

7. The fire extinguishing system of claim 4, wherein the fire detection line includes an inner core line, a gunpowder filling to surround the inner core line, and a sheath material sheathing to surround the gunpowder, and wherein the fire detection line is configured to generate a flame to transmit the flame to the ignition agent when the fire detection line is in contact with a fire occurring at the tire.

8. The fire extinguishing system of claim 2, wherein the pressure generator is screw-engaged with the tank.

9. The fire extinguishing system of claim 2, wherein:
a lower portion of the tank is formed in a truncated cone shape; and
the injection holes are formed in an inclined side surface portion and a bottom surface portion in the lower portion of the tank of the truncated cone shape.

10. The fire extinguishing system of claim 2, wherein the pressure generation chemical comprises solid fuel prepared with sorbitol and potassium nitrate ($KNO_3$).

11. The fire extinguishing system of claim 2, wherein:
each fire extinguishing injector further includes a cover coupled to an outer surface of the tank to seal the injection holes; and
the cover is detachably coupled to the tank due to the injection pressure of the fire extinguishing chemical in the tank, which acts through the injection holes.

12. The fire extinguishing system of claim 11, wherein:
a plurality of hooks are formed on the cover so that the cover is engaged with the tank due to the plurality of hooks; and
each of the plurality of hooks has a shear portion formed to be sheared when a higher level of the injection pressure is applied to the cover due to the fire extinguishing chemical when the cover is engaged.

13. The fire extinguishing system of claim 11, wherein the cover includes a plurality of separated cover members.

14. The fire extinguishing system of claim 2, wherein:
in the tank, each of the injection holes is formed in a blocked structure so that a thickness of each portion of the injection holes is set to be smaller than a thickness of other portion of the tank; and
when the injection pressure of the fire extinguishing chemical in the tank is applied, each portion of the injection holes is damaged to form a hole to allow the fire extinguishing chemical in the tank to be injected.

15. A fire extinguishing system comprising:
a plurality of fire extinguishing injectors filled with fire extinguishing chemicals, the fire extinguishing injectors configured to be installed in a vehicle to be able to inject the fire extinguishing chemical to a tire; and
a fire detection line installed to connect between the plurality of fire extinguishing injectors, wherein each of the fire extinguishing injectors is configured to inject the fire extinguishing chemical when a fire of the tire is detected through the fire detection line;
wherein each of the fire extinguishing injectors comprises a pressure generator in which a pressure generation chemical is installed to generate an injection pressure and a tank filled with the fire extinguishing chemical and having a plurality of injection holes;
wherein an ignition agent coupled to the pressure generation chemical is installed at the pressure generator, the ignition agent being connected to the fire detection line to be ignited by the fire detection line;
wherein the pressure generation chemical is configured to be ignited due to ignition of the ignition agent and thus the injection pressure is generated;
wherein the fire extinguishing system further comprises:
a signal transfer line connected to the ignition agent of the pressure generator in at least one fire extinguishing injector among the plurality of fire extinguishing injectors and configured to transmit a fire detection signal when the ignition agent is ignited;
a controller connected to the ignition agent through the signal transfer line and configured to receive the fire detection signal through the signal transfer line and output a control signal for notifying occurrence of the fire; and
a notification device configured to be operated to notify the occurrence of the fire in response to the control signal which is output from the controller;
wherein the signal transfer line comprises two conductive lines connected from the controller to the ignition agent and a resistor installed to connect between the two conductive lines; and
wherein the two conductive lines are provided to be fused to each other and short-circuited when the ignition agent is ignited.

16. A vehicle comprising:
a vehicle body;
a plurality of tire regions adjacent the vehicle body;
a plurality of tires, each tire located at an associated one of the tire regions;
a plurality of sets of fire extinguishing injectors, each fire extinguishing injector filled with fire extinguishing chemicals, each set of fire extinguishing injectors located to be able to inject the fire extinguishing chemical to an associated one of the tire regions, wherein at least one fire extinguishing injector of each set of extinguishing injectors includes an ignition agent disposed therein; and
a plurality of fire detection lines, each line installed to connect between the fire extinguishing injectors of an associated set, wherein each of the fire extinguishing injectors is configured to inject the fire extinguishing chemical when a fire of the tire in the associated tire region is detected through the fire detection line;
wherein the ignition agent is connected to the fire detection line to be ignited by the fire detection line and connected to a signal transfer line configured to transmit a fire detection signal to a controller when the ignition agent is ignited;
wherein the signal transfer line comprises two conductive lines connected from the controller to the ignition agent and a resistor installed to connect between the two conductive lines; and
wherein the two conductive lines are provided to be fused to each other and short-circuited when the ignition agent is ignited.

17. The vehicle of claim 16, wherein each of the fire extinguishing injectors comprises:
a pressure generator in which a pressure generation chemical is installed to generate an injection pressure; and
a tank filled with the fire extinguishing chemical and having a plurality of injection holes.

18. The vehicle of claim 17, wherein:
the fire detection line is connected to the pressure generator to generate the injection pressure due to the pressure generation chemical when a fire is detected through the fire detection line; and
the tank is coupled to the pressure generator to allow the fire extinguishing chemical in the tank to be injected through the injection holes due to action of the injection pressure generated by the pressure generator.

19. The vehicle of claim 17, wherein:
an ignition agent coupled to the pressure generation chemical is installed at the pressure generator; and the pressure generation chemical is configured to be ignited due to ignition of the ignition agent and thus the injection pressure is generated.

20. The vehicle of claim 17, wherein:

each fire extinguishing injector further includes a cover coupled to an outer surface of the tank to seal the injection holes; and the cover is detachably coupled to the tank due to the injection pressure of the fire extinguishing chemical in the tank, which acts through the injection holes.

* * * * *